(12) United States Patent
Trowbridge (10) Patent No.: US 11,073,346 B2
(45) Date of Patent: Jul. 27, 2021

(54) HYDRAULIC COOLER ASSEMBLY FOR A HEADER OF AN AGRICULTURAL HARVESTER

(71) Applicant: CNH Industrial America LLC, New Holland, PA (US)

(72) Inventor: Jeffrey C. Trowbridge, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/289,674

(22) Filed: Mar. 1, 2019

(65) Prior Publication Data

US 2019/0271514 A1  Sep. 5, 2019

Related U.S. Application Data

(60) Provisional application No. 62/637,096, filed on Mar. 1, 2018.

(51) Int. Cl.

| | | |
|---|---|---|
| *F28F 19/01* | (2006.01) | |
| *B01D 45/08* | (2006.01) | |
| *B01D 45/14* | (2006.01) | |
| *F04D 17/16* | (2006.01) | |
| *F04D 29/70* | (2006.01) | |
| *A01D 41/14* | (2006.01) | |

(Continued)

(52) U.S. Cl.
CPC .............. *F28F 19/01* (2013.01); *A01D 41/14* (2013.01); *B01D 45/08* (2013.01); *B01D 45/14* (2013.01);
(Continued)

(58) Field of Classification Search
CPC ....... F28F 19/01; A01D 41/14; A01D 41/142; A01D 41/1252; A01D 41/06; A01D 69/03;
(Continued)

(56) References Cited

U.S. PATENT DOCUMENTS 3,309,847 A * 3/1967 Donaldson ............. B60K 11/04
                                                    55/282.4
4,116,279 A     9/1978 Kilburn
(Continued)

FOREIGN PATENT DOCUMENTS

| EP | 1862062 A2 | 12/2007 | |
|---|---|---|---|
| GB | 1425464 A * | 2/1976 | ............. B01D 45/16 |

(Continued)

OTHER PUBLICATIONS

Extended European Search Report for EP Application 19160323.2 dated Jul. 4, 2019 (six pages).

*Primary Examiner* — Tho V Duong
(74) *Attorney, Agent, or Firm* — Peter Zacharias; Patrick Sheldrake (57) ABSTRACT

A header for an agricultural harvester is disclosed. The header comprises a frame, a cooler assembly support by the frame for cooling a hydraulic system of the header, and a hydraulic system. The cooler assembly includes an air pre-cleaner for receiving air and outputting a flow of air, a rotary fan downstream the air pre-cleaner, and a heat exchanger downstream and in fluid communication with a first air output of the rotary fan. The rotary fan includes an air intake in fluid communication with the air pre-cleaner for receiving the flow of air, a first air output in fluid communication with the air intake, and a second air output in fluid communication with the air intake and spaced from the first air output. The hydraulic system is downstream the heat exchanger and receives an output flow of air from the cooler assembly.

12 Claims, 7 Drawing Sheets

(51) Int. Cl.
*F04D 19/00* (2006.01)
*A01D 69/03* (2006.01)
*B60K 11/00* (2006.01)

(52) U.S. Cl.
CPC ............ *F04D 17/16* (2013.01); *F04D 29/703* (2013.01); *A01D 41/142* (2013.01); *A01D 69/03* (2013.01); *B60K 11/00* (2013.01); *B60Y 2200/222* (2013.01); *B60Y 2306/05* (2013.01); *F04D 19/002* (2013.01)

(58) Field of Classification Search
CPC ........ B01D 45/08; B01D 45/12; B01D 45/14; B01D 45/16; F04D 17/16; F04D 29/703; F02M 35/0223; F02M 35/0226; B60Y 2306/05; B60Y 2200/222; B60H 2200/222; B60H 3/0641; F01P 11/12; F01P 5/06; B60K 11/00
See application file for complete search history.

(56) References Cited

U.S. PATENT DOCUMENTS

| | | | | |
|---|---|---|---|---|
| 4,874,411 A | * | 10/1989 | Snauwaert | B01D 46/26 55/290 |
| 5,816,351 A | * | 10/1998 | Akira | B60K 11/08 180/68.1 |
| 6,974,487 B2 | * | 12/2005 | Twiefel | A01D 41/1252 55/289 |
| 7,682,413 B2 | * | 3/2010 | Sheidler | F02M 35/022 55/345 |
| 9,675,920 B2 | * | 6/2017 | Finn | F02M 35/0216 |
| 9,763,388 B2 | | 9/2017 | Joyce | |
| 2006/0076120 A1 | | 4/2006 | Bollweg | |
| 2007/0007061 A1 | | 1/2007 | Meyer et al. | |
| 2007/0199293 A1 | | 8/2007 | Barnett | |
| 2008/0257531 A1 | * | 10/2008 | D'hondt | A01D 41/1252 165/104.34 |
| 2016/0341158 A1 | * | 11/2016 | Rosenfeld | F02M 35/10013 |
| 2017/0030250 A1 | | 2/2017 | Graaf et al. | |

FOREIGN PATENT DOCUMENTS

| | | | |
|---|---|---|---|
| GB | 2353505 A | | 2/2001 |
| JP | 55151118 U | * | 10/1980 |
| JP | 19857681 A | * | 6/2000 |
| JP | 2003049648 A | | 2/2003 |
| JP | 2003214397 A | | 7/2003 |
| JP | 20100156149 A | | 7/2010 |
| JP | 2013104167 A | | 5/2013 |
| WO | 2009139685 A1 | | 11/2009 |

* cited by examiner

FIG. 7B

HYDRAULIC COOLER ASSEMBLY FOR A HEADER OF AN AGRICULTURAL HARVESTER

FIELD OF THE INVENTION

The present disclosure relates generally to headers of plant cutting machines (e.g., combine harvesters) and, more specifically, to hydraulic cooler assemblies for hydraulic systems of the headers.

BACKGROUND OF THE INVENTION

Agricultural harvesters, e.g., plant cutting machines, including, but not limited to, combines or windrowers, generally include headers operable for severing and collecting plant or crop material as the harvester is driven over a crop field. Such headers have plant cutting mechanisms for severing the plants or crop, such as an elongated sickle mechanism, that reciprocates sidewardly relative to a non-reciprocating guard structure or a row unit with gathering chains and deck plates. Such headers further include one or more draper belts for feeding the cut plants or crop towards a feederhouse located centrally of the header.

To facilitate its operation, an agricultural harvester also includes a hydraulic system, which may partially be supported by the header. Typical hydraulic systems pump hydraulic fluid to various components of the agricultural harvester, such as the power steering and actuators, to facilitate the operation of those components. However, during operation, the hydraulic fluid rapidly heats up and, consequently, needs cooling in order to minimize damage to the hydraulic fluid-receiving components. One method of cooling hydraulic fluid is through convection by using air extracted from outside the header. However, outside air is typically filled with debris that, if not properly filtered, will damage the hydraulic system by, e.g., clogging the hydraulic system and causing the hydraulic fluid to heat up.

Typical hydraulic systems utilize filter screens to filter larger debris from the outside air before it is pumped through the header. However, such filters suffer from multiple deficiencies including, but not limited to: (1) clogging to such an extent that no air can pass through; (2) breaking when harder debris, such as rocks, hit the screen; (3) ineffectiveness in blocking smaller debris; and (4) blocking too much airflow when greater airflow is needed to keep up with cooling the hydraulic fluid. Each of these deficiencies require a user to clean and/or replace the filter screen.

Therefore, there is a continuing need for a cooling assembly having an air filtration system that can minimize the need for user intervention while effectively cleaning debris-filled air before the air is used to cool hydraulic fluid.

EMBODIMENTS OF THE INVENTION

One exemplary embodiment according to the present disclosure is a header for an agricultural harvester comprising a frame, a cooler assembly support by the frame for cooling a hydraulic system of the header, and a hydraulic system. The cooler assembly includes an air pre-cleaner for receiving air and outputting a flow of air, a rotary fan downstream the air pre-cleaner, and a heat exchanger downstream and in fluid communication with a first air output of the rotary fan. The rotary fan includes an air intake in fluid communication with the air pre-cleaner for receiving the flow of air, a first air output in fluid communication with the air intake, and a second air output in fluid communication with the air intake and spaced from the first air output. The hydraulic system is downstream the heat exchanger and receives an output flow of air from the cooler assembly.

In certain exemplary embodiments, the cooler assembly can further include a duct between the air pre-cleaner and the rotary fan. In certain exemplary embodiments, the duct can be a conically shaped duct. In certain exemplary embodiments, the cooler assembly can further include an airflow duct between the rotary fan and the heat exchanger.

In certain exemplary embodiments, the above air pre-cleaner can include an air intake, an angled fin downstream the air intake configured to divert airflow to a lateral side of the air pre-cleaner, a rotatable blade downstream the angled fin, an opening downstream the angled fin along a lateral side of the air pre-cleaner, and an outlet. In certain exemplary embodiments, the outlet of the air pre-cleaner can face a direction substantially parallel a longitudinal length of the header. In certain exemplary embodiments, the opening of the air pre-cleaner can be in fluid communication with an exhaust facing downwardly with respect to the header.

In certain exemplary embodiments, the second air output of the rotatory fan can be radially spaced further than the first air output from a central rotational axis of the rotary fan. In certain exemplary embodiments, the first air output of the rotatory fan can direct an output flow of air in a direction substantially transverse to a direction of the flow of air from the air pre-cleaner. In certain exemplary embodiments, the first air output of the rotatory fan can direct an output flow of air in a direction substantially parallel to a direction of the flow of air from the air pre-cleaner. In certain exemplary embodiments, the second air output of the rotatory fan circumscribes the first air output of the rotatory fan.

In certain exemplary embodiments, the rotary fan can include a baffle between the first air output and the second air output. In certain exemplary embodiments, the baffle can be movable between a first position and a second position relative to the central rotational axis of the rotary fan configured to adjust a size of one of the first air output and the second air output. In certain exemplary embodiments, the header may further comprise a fan adjacent the heat exchanger.

Another exemplary embodiment according to the present disclosure is an agricultural harvester comprising a cab and a header. The header includes a frame, a cooler assembly support by the frame for cooling a hydraulic system of the header, and a hydraulic system. The cooler assembly includes an air pre-cleaner for receiving air and outputting a flow of air, a rotary fan downstream the air pre-cleaner, and a heat exchanger downstream and in fluid communication with a first air output of the rotary fan. The rotary fan includes an air intake in fluid communication with the air pre-cleaner for receiving the flow of air, a first air output in fluid communication with the air intake, and a second air output in fluid communication with the air intake and spaced from the first air output. The hydraulic system is downstream the heat exchanger and receives an output flow of air from the cooler assembly.

In certain exemplary embodiments, the second air output of the rotatory fan can be radially spaced further than the first air output from a central rotational axis of the rotary fan. In certain exemplary embodiments, the first air output of the rotatory fan can direct an output flow of air in a direction substantially transverse to a direction of the flow of air from the air pre-cleaner. In certain exemplary embodiments, the first air output of the rotatory fan can direct an output flow of air in a direction substantially parallel to a direction of the flow of air from the air pre-cleaner. In certain exemplary embodiments, the rotary fan can include a baffle between the first air output and the second air output. In certain exemplary embodiments, the baffle can be movable between a first position and a second position relative to the central rotational axis of the rotary fan configured to adjust a size of one of the first air output and the second air output.

BRIEF DESCRIPTION OF THE SEVERAL VIEWS OF THE DRAWINGS

The foregoing exemplary embodiments, as well as the following detailed description of the exemplary embodiments, will be better understood when read in conjunction with the appended drawings. For purposes of illustration, there are shown in the drawings exemplary embodiments. It should be understood, however, that the exemplary embodiments are not limited to the precise arrangements and instrumentalities shown.

In the drawings.

DETAILED DESCRIPTION OF THE INVENTION

Reference will now be made in detail to the various exemplary embodiments illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below, and diagonal are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject disclosure is applicable to a variety of crops, including but not limited to wheat, soybeans, and small grains. The terms "debris," "material other than grain," and the like are used interchangeably.

"About," as used herein, when referring to a measurable value such as an amount, a temporal duration, and the like, is meant to encompass variations of ±20%, ±10%, ±5%, ±1%, or ±0.1% from the specified value, as such variations are appropriate.

"Substantially," as used herein, shall mean considerable in extent, largely, but not wholly, that which is specified, or an appropriate variation therefrom as is acceptable within the field of art.

Throughout this disclosure, various aspects of the exemplary embodiments can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages, and characteristics of the exemplary embodiments may be combined in any suitable manner in one or more embodiments. One skilled in the relevant art will recognize, in light of the description herein, that the exemplary embodiments can be practiced without one or more of the specific features or advantages of a particular exemplary embodiment. In other instances, additional features and advantages may be recognized in certain embodiments that may not be present in all exemplary embodiments.

Additionally, for convenience purposes only, identical or substantially identical elements of the exemplary embodiments may be described with reference to only one of those elements. It is appreciated therefore that the description of one element is equally applicable to the remainder of the same elements. As such, identical elements, or substantially identical elements where so indicated, will be identified, where appropriate, by the same reference numeral, e.g., 10, and distinguished by an alphabetical letter, e.g., A, B, C, D, etc. For example, element 10A is one element, element 10B is another of the same element, element 10C is yet another of the same element, and so forth. Moreover, alternate exemplary embodiments of elements, such as element 10A, may be distinguished by way of a "'", e.g., element 10A', with the understanding that the teachings of element 10A applies to element 10A', except where otherwise indicated.

Referring now to the drawings, FIGS. 1 through 7B illustrate exemplary embodiments of the present disclosure.

For exemplary purposes only, the agricultural harvester is illustrated as a combine harvester 100. The harvester 100 comprises a header 200 and a cab 102 for an operator of the harvester. The header 200 includes a frame 104, a cooler assembly 300 or 300', and a hydraulic system 350 or 350'.

Figure 1:
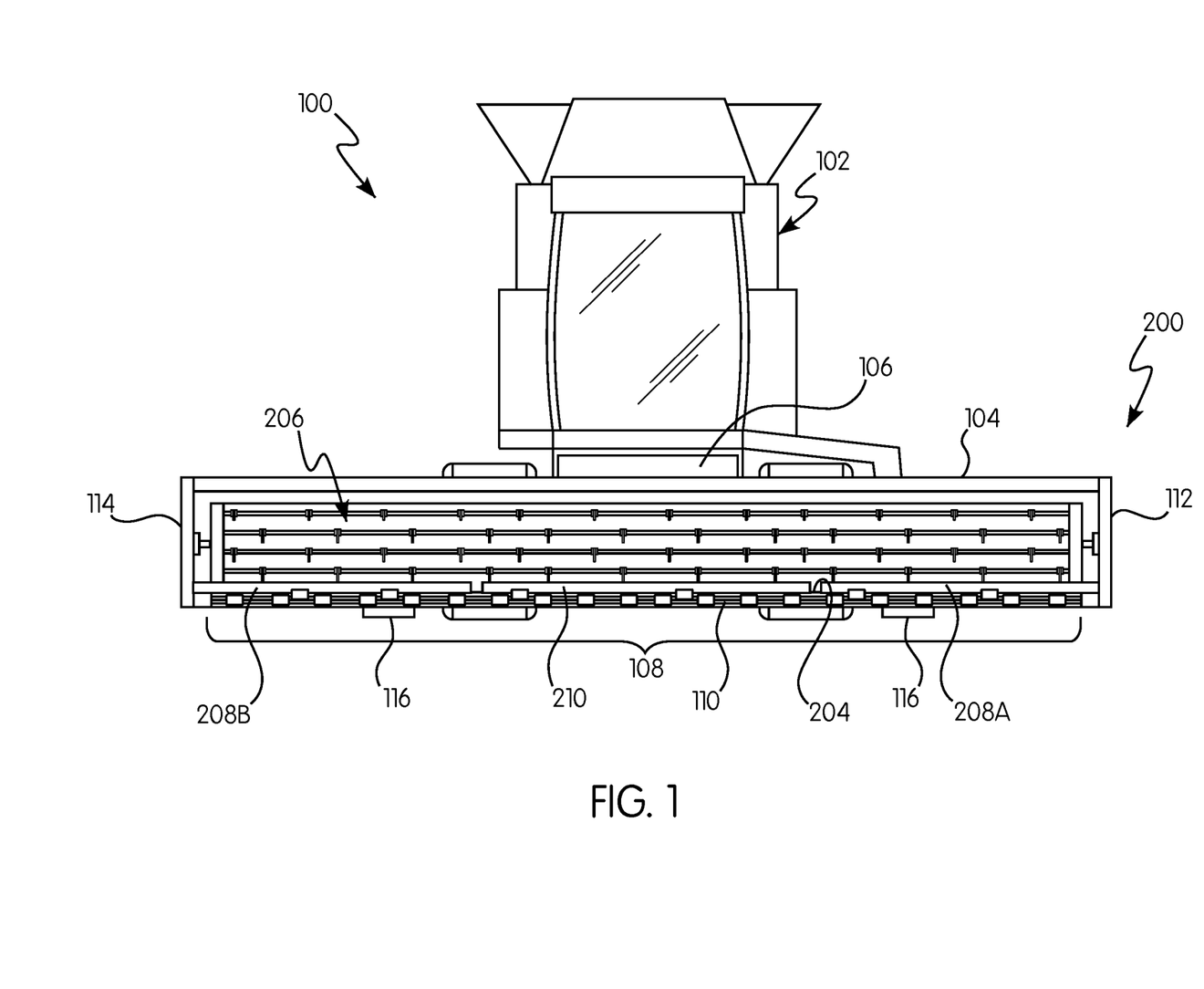
FIG. 1 is a front elevation view of an agricultural harvester including a header in accordance with an exemplary embodiment of the present disclosure.
Figure 2:
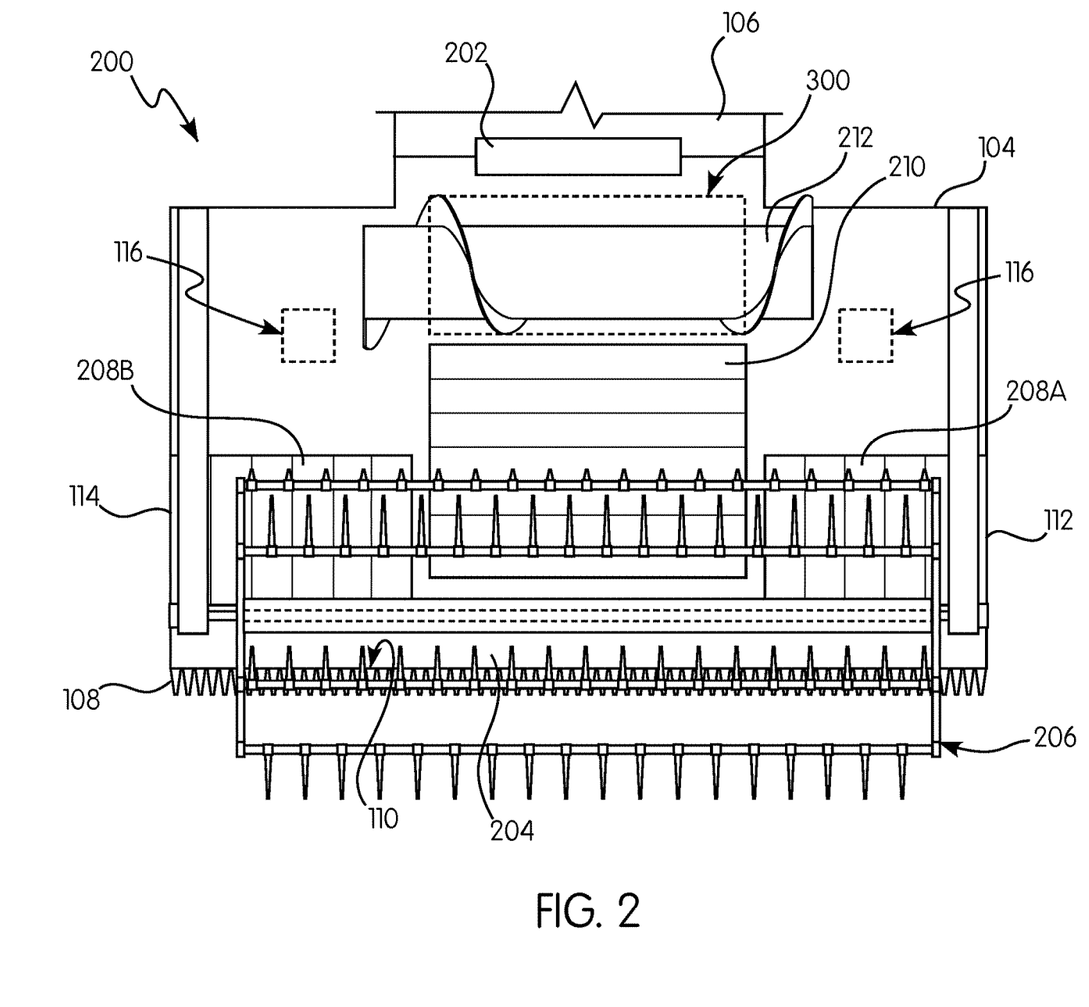
FIG. 2 is a simplified top schematic view of the header of FIG. 1.

Referring now to FIGS. 1 and 2, the frame 104 is the structural chassis of the header 200 and allows for the various components of the header 200 to be attached thereto. The header 200 is attached to a forward end 106 of the harvester 100 and is configured to cut crops, including (without limitation) small grains (e.g., wheat, soybeans, grain, etc.), and to induct the cut crops into a feederhouse 202 as the harvester 100 moves forward over a crop field.

The header 200 includes a floor 204 supported in desired proximity to a surface of a crop field and a cutter bar 108. The cutter bar 108 of the header 200 extends transversely along a front end 110 of the floor 204, i.e., in a widthwise direction of the harvester 100, and is bound by a first side edge 112 and an opposing second side edge 114, which are both adjacent to the floor 204. The cutter bar 108 is configured to cut crops in preparation for induction into the feederhouse 202. It is appreciated that the cutter bar 108 includes one or more reciprocating sickles, such as those disclosed in U.S. Pat. No. 8,151,547, the entire disclosure of which is incorporated herein by reference for all purposes.

The exemplary header 200 can include an elongated and rotatable harvesting reel assembly 206 that extends above and in close proximity to the cutter bar 108. The harvesting reel assembly 206 is configured to cooperate with a plurality of draper belts, such as lateral draper belts 208A and 208B and an infeed draper belt 210 for conveying cut crops to the feederhouse 202. The header 200 may include a rotatable auger 212, e.g., a conveyor screw, to facilitate feeding into the feederhouse 202. Exemplary rotatable harvesting reel assemblies applicable to the present disclosure are disclosed in, e.g., U.S. Patent Application Publication No. 2016/0255773 and U.S. Pat. No. 6,170,244, the entire disclosures of which are incorporated herein by reference for all purposes.

The hydraulic system 350 is operatively connected to the moving components of the harvester 100 and/or header 200, such as, but not limited to, the cutter bar 108, the harvesting reel assembly 206, pistons, actuators, and so forth and facilitates the operation and use of the harvester. For convenience purposes only, such moving components are hereafter generally referred to as an "output shaft 352." Such hydraulic systems are well known in the art and do not necessitate extensive discussion for purposes of this disclosure. Exemplary hydraulic systems applicable to the subject disclosure are disclosed in U.S. Patent Application Publication Nos. 2017/0291636 A1 and 2017/0215329 A1, the entire disclosures of which are incorporated herein by reference for all purposes.

The cooler assembly 300 is operatively supported by the frame 104 and operatively connected to the hydraulic system 350. Exemplary embodiments of the cooler assembly are described herein. While the foregoing aspects of the harvester are being described with respect to the header shown, the cooler assembly of the subject disclosure can be applied to any other header having use for such a cooler assembly.

Referring now to FIGS. 3 through 5B, the cooler assembly 300 is configured substantially as shown. The cooler assembly 300 includes an air pre-cleaner 400, a rotary fan 500, and a heat exchanger 302.

Figure 3:
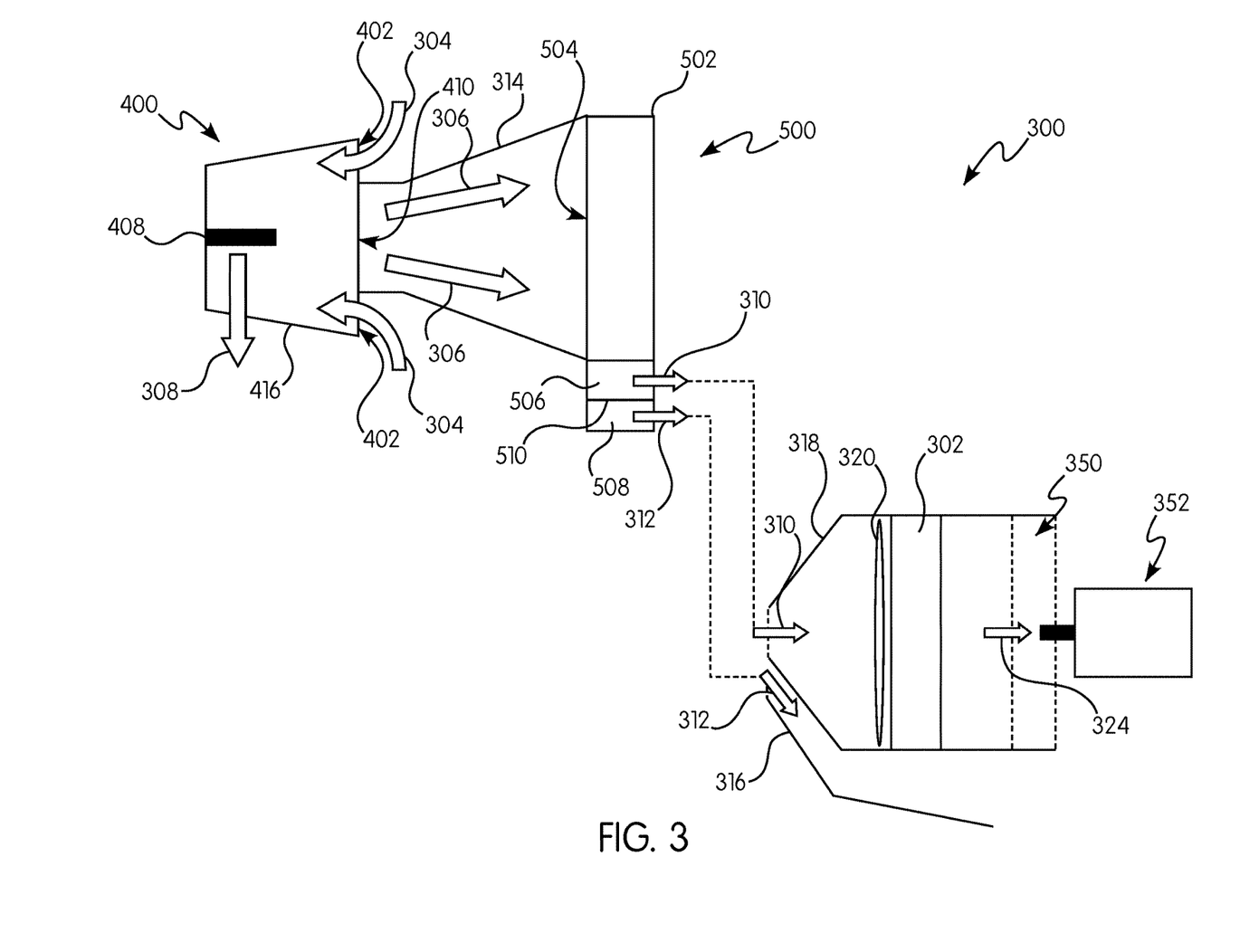
FIG. 3 is a simplified schematic view of a cooler assembly in accordance with an exemplary embodiment of the present disclosure.
Figure 4A:
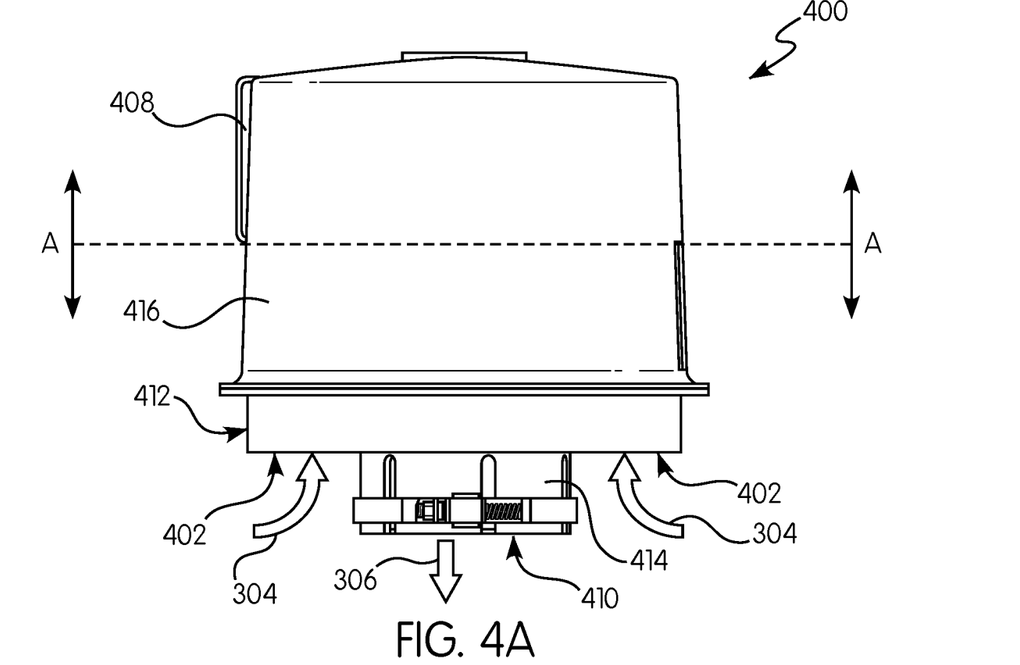
FIG. 4A is a front elevation view of an air pre-cleaner in accordance with an exemplary embodiment of the present disclosure.
Figure 4B:
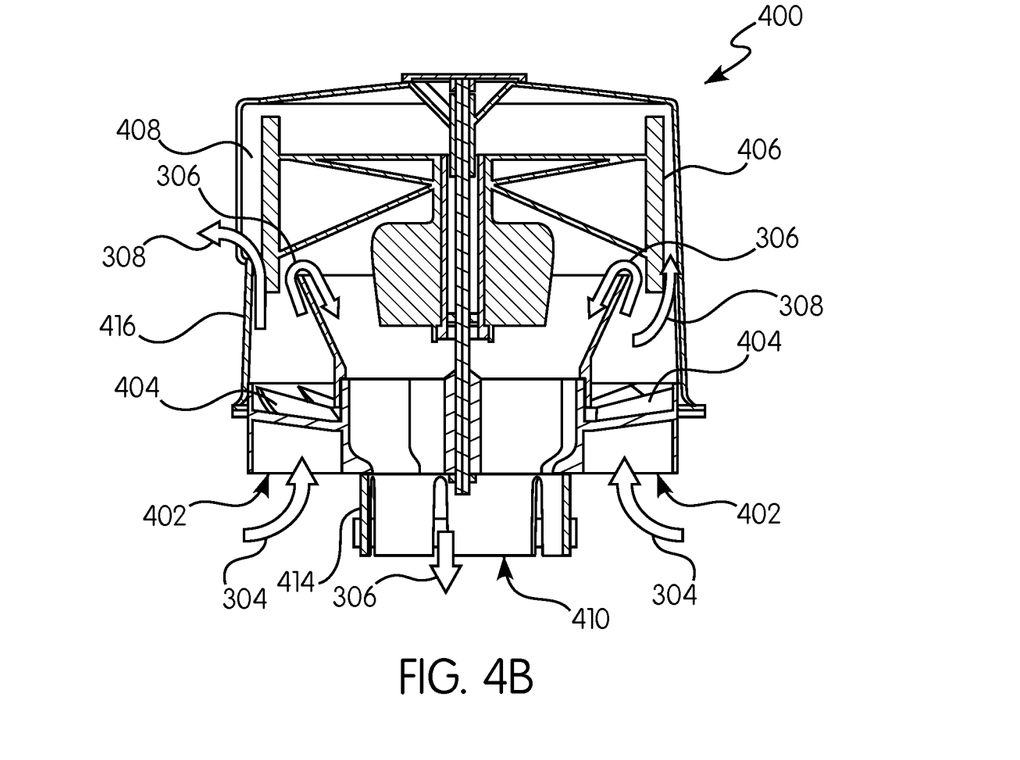
FIG. 4B is a cross-sectional view of the air pre-cleaner of FIG. 4A along A-A.

Referring now to FIGS. 3-4B, the air pre-cleaner 400 is configured substantially as shown. The air pre-cleaner 400 is configured to receive air 304 from outside the header 200, which may have particulates or debris therein, and output debris 308, if any, and a flow of air 306, which has been at least partially cleaned by the air pre-cleaner. The air pre-cleaner 400 includes an air intake 402, a plurality of angled fins 404, a rotatable blade 406, an opening 408, and an outlet 410.

The air intake 402 is in fluid communication with an air source, such as air outside of the header 200, for receiving an airflow 304. In an exemplary embodiment, the air intake 402 extends through a bottom 412 of the air pre-cleaner 400 and circumscribes the outlet 410. The outlet 410 extends through the bottom 412 of the air pre-cleaner and forms a distal end of a passageway 414 extending from inside the air pre-cleaner and to the bottom. The angled fins 404 extend between the passageway 414 and to a lateral side 416, which defines the outer structure of the air pre-cleaner 400. The angled fins 404 are angled relative to the bottom 412 and are configured to divert airflow to the lateral side 416. The rotatable blade 406 is a rotatable member having a wingspan substantially reaching, but spaced from, the lateral side 416. The rotatable blade 406 is configured to rotate about a central axis aligned with the outlet 410 such that debris in the air 304 is pushed radially outwardly towards the lateral side 416. The opening 408 is adjacent the lateral side 416 and is in fluid communication with an exhaust 116 of the header 200, which is in fluid communication with outside the header. The opening 408 is aligned with the rotatable blade 406 such that debris 308 can pass through the opening 408.

In other words, the air pre-cleaner includes an air intake, an angle fin downstream the air intake configured to divert airflow to a lateral side of the air pre-cleaner, a rotatable blade downstream the angled fin, an opening downstream the angled fin along a lateral side of the air pre-cleaner, and an outlet.

Figure 5A:
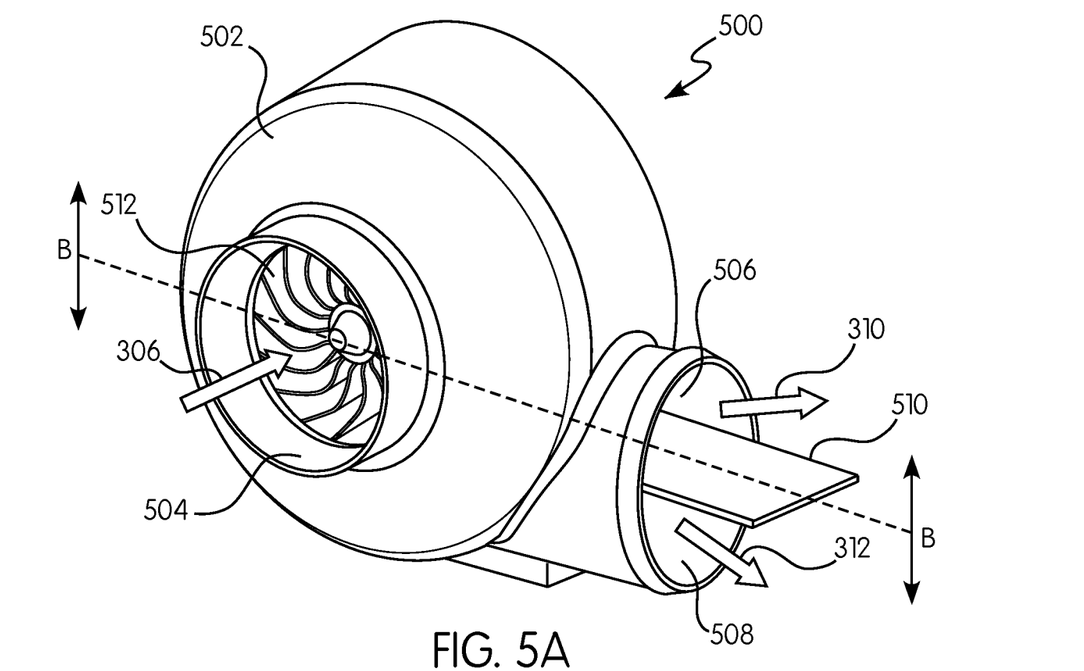
FIG. 5A is a perspective view of a rotary fan in accordance with an exemplary embodiment of the present disclosure.
Figure 5B:
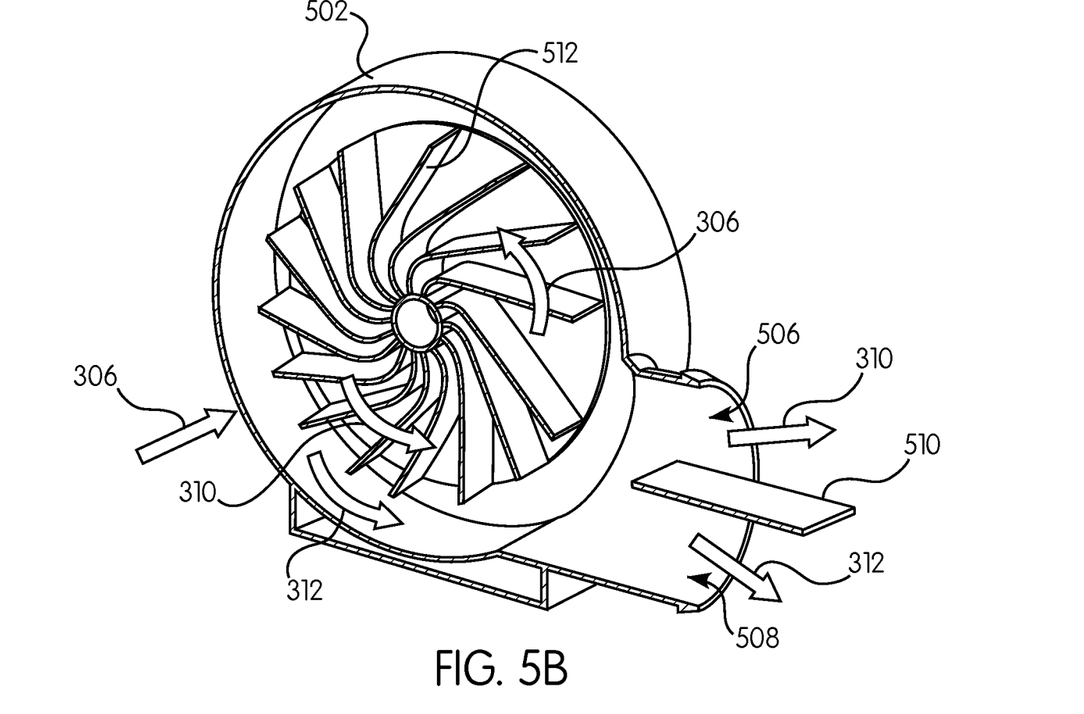
FIG. 5B is a cross-sectional view of the rotary fan of FIG. 5A along B-B.

Referring now to FIGS. 3, 5A, and 5B, in accordance with an exemplary embodiment, the rotary fan 500 is configured substantially as shown. The rotary fan 500 is configured to receive air 306 from the air pre-cleaner 400 which may have particulates or debris therein. The rotary fan 500 is further configured to output a flow of air 310 cleaned by the rotary fan, as well as an output flow of additional debris 312, if any. The rotary fan 500 includes a housing 502, an air intake 504, a first air output 506, a second air output 508, a baffle 510 and a rotatable blade 512.

The housing 502 forms the structural housing of the rotary fan 500. In an exemplary embodiment, the air intake 504 is an aperture along a lateral side of the housing 502 and is configured to be in fluid communication with the air pre-cleaner 400 for receiving the flow of air 306. The first and second air outputs 506 and 508 are formed as apertures along the housing 502 downstream from the air intake 504. In an exemplary embodiment, the air intake 504 opens or faces in a direction transverse to the first and second air outputs 506 and 508, and the second air output is positioned radially further away from a rotational axis of the rotatable blade 512 than the first air output. Additionally, the first air output 506 is configured to output the cleaned flow of air 310 and the second air output 508 is configured to output the flow of air with, if any, additional debris 312. In other words, the second air output of the rotary fan is radially spaced further than the first air output from a central rotational axis of the rotary fan. Further, the first air output of the rotary fan directs an output flow of air in a direction substantially transverse to a direction of the flow of air from the air pre-cleaner.

The baffle 510 is an elongated member separating the first and second air outputs 506 and 508. In an exemplary embodiment, the baffle 510 is movable relative to the first and second air outputs 506 and 508 such that at least one of the first and second air outputs is adjustable to control the amount of airflow permitted to flow through the first and second air outputs. For example, a size of the apertures forming the first and second air outputs 506 and 508 is configured to be adjustable by moving the baffle 510 in order to expand, shrink, or block the apertures. The baffle 512 may be physically incorporated into the housing 502, and/or may be positioned adjacent to the outputs 506 and 508.

The rotatable blade 512 is positioned inside the housing 502 and includes a rotatable member having a wingspan substantially reaching, but spaced from, the walls of the housing 502. The rotatable blade 512 is configured to rotate about a central axis aligned with the air intake 504 such that debris in the air 306 is pushed radially outwardly towards the housing walls and the second air output 508. In other words, the rotary fan includes a baffle between the first air output and the second air output. The baffle is movable between a first position and a second position relative to the central rotational axis of the rotary fan configured to adjust a size of one of the first air output and the second air output or to adjust the size of the first and second air outputs.

The heat exchanger 302 is configured to cool the flow of air 310. Such heat exchangers are well known in the art and a detailed discussion of which is not necessary for purposes of this disclosure. An exemplary heat exchanger applicable to the present disclosure can be found in U.S. Pat. No. 9,763,388, the entire disclosure of which is incorporated by reference herein.

Additionally, the header 200 can include additional components to facilitate the operation of the above disclosure. For example, the header 200 can further include a duct 314, an exhaust duct 316, an airflow duct 318, and a fan 320, all of which can be configured substantially as shown in FIG. 3. Additionally, the cooler assembly 300 can further include filters, such as fiberglass filters, high efficiency particular arrestance filters, and so forth, throughout the ducts for further facilitating cleaning the air. Such filters are well known in the art and a detailed discussion of which is not necessary for purposes of this disclosure.

The duct 314 is configured to be a hermetically sealed tunnel between the air pre-cleaner 400 and the rotary fan 500. In an exemplary embodiment, the duct 314 expands radially outward along its length in a conical shape from the air pre-cleaner 400 to the rotary fan 500. Consequently, the duct 314 is configured to adjust a pressure of the airflow 306 inside the duct. The exhaust duct 316 is configured to be a hermetically sealed tunnel between the second air output 508 and the exhaust 116 for exhausting the debris 312. It is appreciated that the exhaust duct 316 can be in fluid communication with outside the header directly, rather than through the exhaust 116. The airflow duct 318 is configured to be a hermetically sealed tunnel between the first air output 506 and the heat exchanger 302.

In other words, the cooler assembly further includes a duct between the air pre-cleaner and the rotary fan. The duct is a conically shaped. The duct extends between an outlet of the air pre-cleaner and the air intake of the rotary fan. The duct hermetically seals the outlet of the air pre-cleaner and the air intake of the rotary fan. The cooler assembly further includes an airflow duct between the rotary fan and the heat exchanger. The airflow duct hermetically seals the first air output of the rotary fan and the heat exchanger.

In an exemplary embodiment, the fan 320 is an axial fan. The fan 320 can be configured to pull air through the heat exchanger 302. The fan 320 can be positioned adjacent to and upstream the heat exchanger 302 and include an impellor blade rotatable about an axis parallel to a direction of the airflow 310. The impellor blade can be configured to break apart minor debris that may not have been filtered by the air pre-cleaner 400 and the rotary fan 500. The fan 320 can be motorized or be configured to freely rotate as air passes through the fan. The impellor blade can also be angled relative to the flow of air 310 so as to generate rotational motion about the axis parallel to the direction of the airflow. Such fans are well known in the art and do not necessitate extensive discussions for purposes of this disclosure. In other words, the header further comprises a fan adjacent the heat exchanger. Additionally, the fan can be positioned upstream the heat exchanger and include an impellor blade.

Referring now to FIGS. 1 through 3, the header 200 is operatively connected to the harvester 100. The cooler assembly 300 is operatively connected to the header 200 and the hydraulic system 350 is operatively connected to the cooler assembly. Specifically, the air pre-cleaner 400 is in fluid communication with an exterior of the header via the air intake 402 for receiving the flow of air 304 and in fluid communication with the exterior of the header via the opening 408 and exhaust 116 for exhausting the debris 308. The air pre-cleaner 400 is further in fluid communication with the rotary fan 500 via the outlet 410, duct 314 and air intake 504. The rotary fan 500 is further in fluid communication with an exterior of the header via the second air output 508 and the exhaust duct 316, and with the heat exchanger 302 via the first air output 506 and the airflow duct 318. The heat exchanger 302 is downstream the rotary fan 500, and the hydraulic system 350 is downstream the heat exchanger 302. The hydraulic system 350 is operatively connected to the output shaft 352 for facilitating the operation of the header 200. The fan 320 may additionally be positioned upstream the heat exchanger 302 for pulling the flow of air through the heat exchanger and/or for breaking apart additional particulates in the air flow 310.

In an exemplary embodiment, the air pre-cleaner 400 is positioned such that the outlet 410 faces in one of a lateral, anterior or posterior direction relative to the header 200. In other words, the outlet of the air pre-cleaner faces a direction substantially parallel a longitudinal length of the header. Additionally, the exhaust 116 is positioned on an underside of the header 200 such that the debris 308 and 312 are expelled downwardly relative to the header. In other words, the opening of the air pre-cleaner is in communication with an exhaust facing downwardly with respect to the header. However, it is appreciated that the exhaust can be positioned anywhere along the header and may exhaust in any direction from the header as necessary to facilitate operation of the header.

An exemplary embodiment of the subject disclosure operates by pulling air 304 from outside the header 200 and cleaning the air via the air pre-cleaner 400 and the rotary fan 500 in order to output a cleaned flow of air 310 to the heat exchanger 302, which is thereafter used by the hydraulic system 350. Specifically, air 304 is taken in from outside the header 200 and directed to the air intake 402 of the air pre-cleaner 400. The air 304 flows through the air pre-cleaner 400 and is diverted to its lateral side 416 via the angled fins 404 and the rotatable blade 406. Debris 308 separated from the air 304 is expelled out of the opening 408. The air pre-cleaner 400 then outputs a cleaner flow of air 306 towards the air intake 504 of the rotatable fan 500 through the duct 314. The air 306 is diverted towards the walls of the housing 502 of the rotatable fan 500 via the rotatable blade 512 and is thereafter carried towards the first or second air outputs 506, 508. Specifically, debris 312 separated from the air 306 is diverted towards the second air output 508 while clean air 310 flows out of the first air output 506. The clean air 310 thereafter passes through the heat exchanger 302 to be cooled. Finally, cooled air 324 flows from the heat exchanger 302 to the hydraulic system 350 whereby it is used to cool hydraulic fluid used by the output shaft 352, such as an actuator for raising the header.

It is appreciated that the subject disclosure can be modified without deviating from the scope of the subject disclosure. For example, FIGS. 6 through 7B disclose additional exemplary embodiments.

Figure 6:
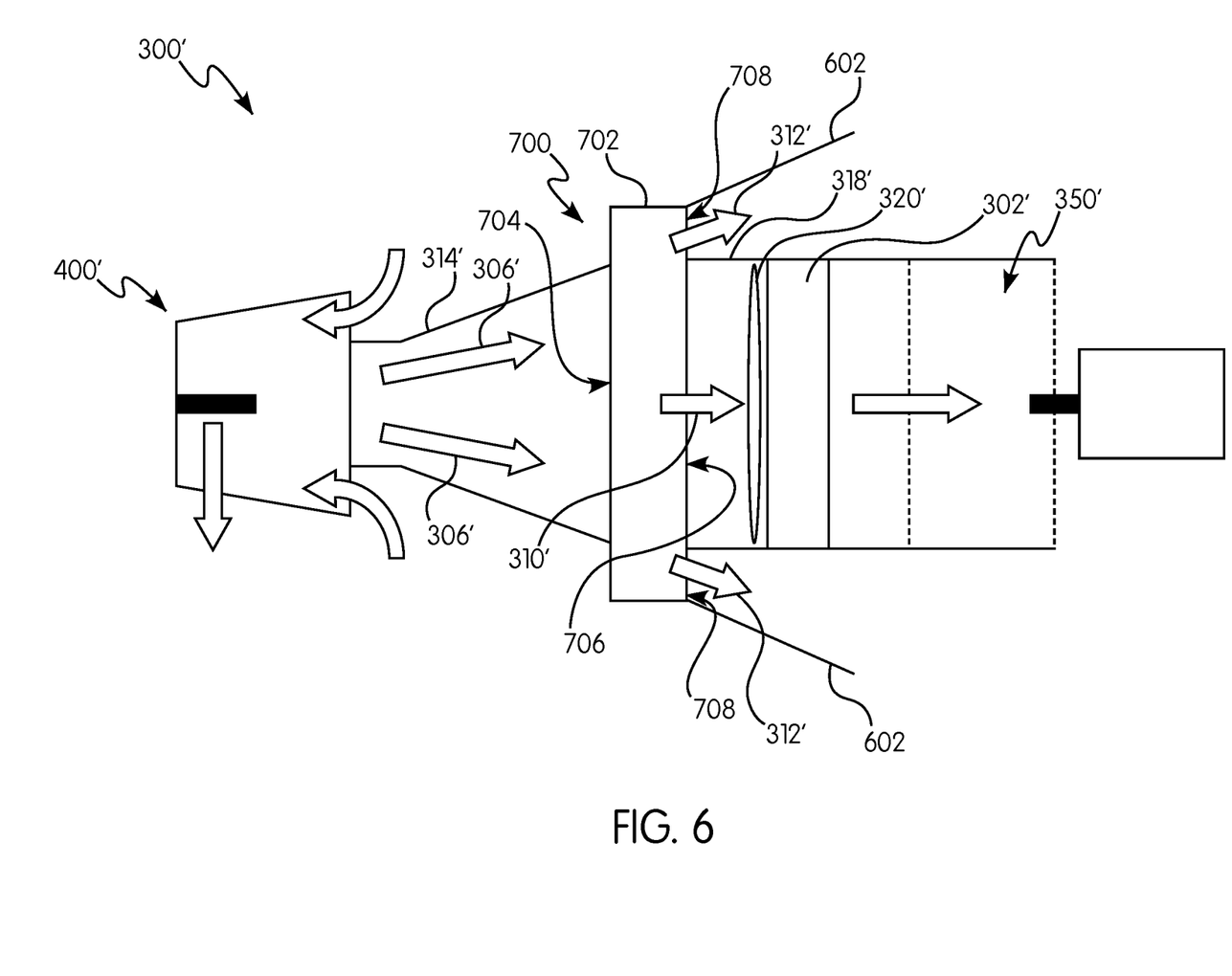
FIG. 6 is a simplified schematic view of a cooler assembly in accordance with another exemplary embodiment of the present disclosure.
Figure 7A:
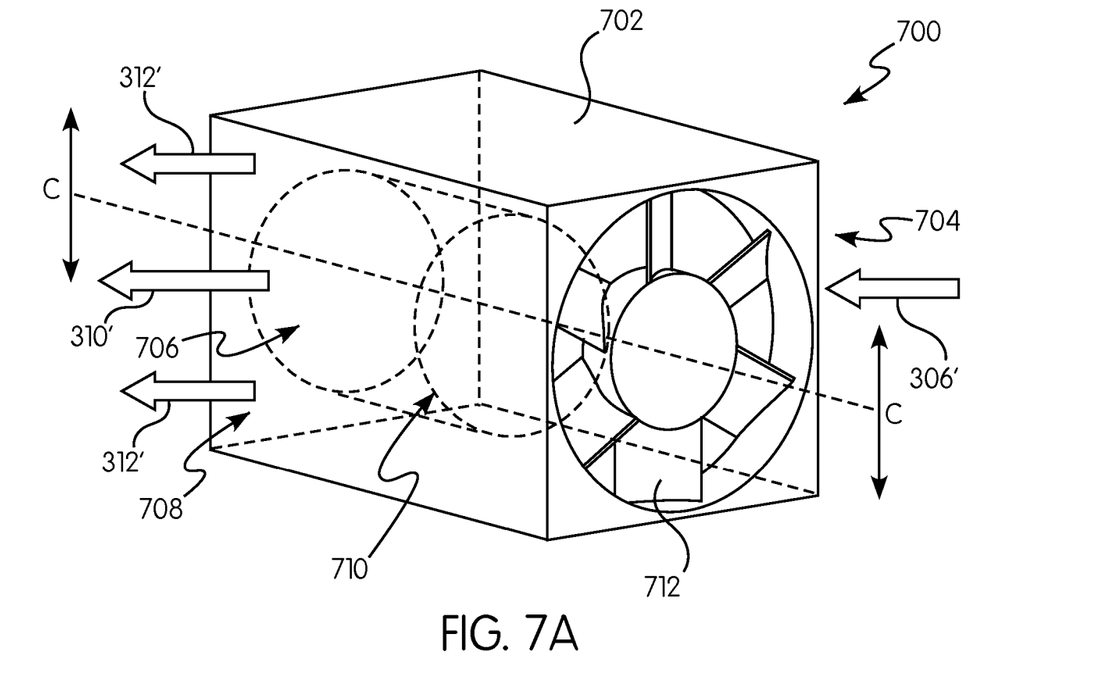
FIG. 7A is a perspective view of a rotary fan in accordance with an exemplary embodiment of the present disclosure.

Referring now to FIG. 6, an exemplary cooler assembly 300' is configured substantially as shown. The cooler assembly 300' is identical or substantially identical to the cooler assembly 300 in that the cooler assembly 300' includes a similar air pre-cleaner 400', duct 314', airflow duct 318', and fan 320' as the cooler assembly's 300 air pre-cleaner 400, duct 314, airflow duct 318, and fan 320. Additionally, the cooler assembly 300' is substantially similarly operatively connected to a hydraulic system 350' as the cooler assembly 300 is connected to the hydraulic system 350.

Figure 7B:
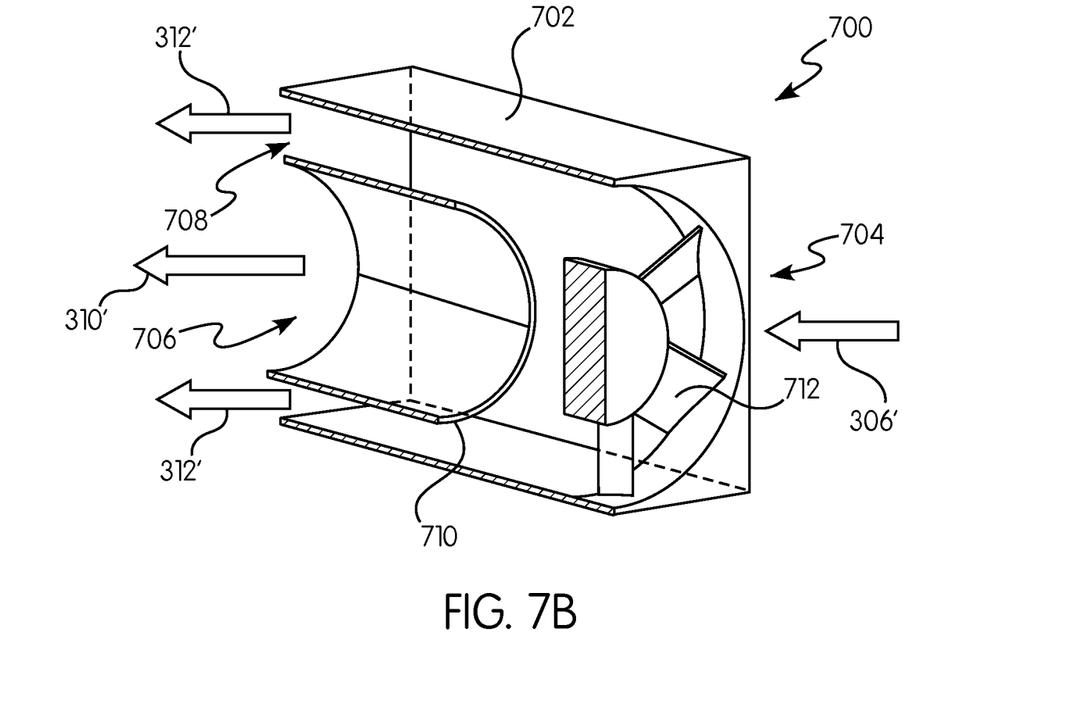
FIG. 7B is a cross-sectional view of the rotary fan of FIG. 7A along C-C.

The cooler assembly 300' further includes a rotary fan 700 and an exhaust duct 602. The rotary fan 700 is similar to the rotary fan 500 in that the rotary fan 700 is configured to receive air 306', output air 310' and debris 312', and includes a housing 702, an air intake 704, a first air output 706, a second air output 708, a baffle 710, and a rotatable blade 712. The rotary fan 700 differs from the rotary fan 500 in that the first and second air outputs 706 and 708 are formed as apertures downstream and opposing the air intake 704 such that the second air output circumscribes the first air output. In other words, the first air output of the rotary fan directs an output flow of air in a direction substantially parallel to a direction of the flow of air from the air pre-cleaner. Additionally, the second air output of the rotary fan circumscribes the first air output of the rotary fan. Moreover, the baffle 710 is positioned inside the housing 702 and defines the first air output 706. It is appreciated that the baffle 710 may form the outer walls of the first air output 706. In an exemplary embodiment, the baffle 710 is expandable to adjust the size of the first and second air outputs 706 and 708. Additionally, the rotatable blade 712 is positioned inside the cavity of the housing 702 and adjacent to the air intake 704, and includes a rotatable member having a wingspan substantially reaching, but spaced from, the walls of the housing 702. The rotatable blade 712 is configured to rotate about a central axis aligned with the air intake 704 such that debris in the air 306' is pushed radially outwardly towards the housing walls and the second air output 708.

The cooler assembly 300' is interconnected similarly or substantially similarly to how the cooler assembly 300 is interconnected, except as otherwise indicated below.

Specifically, the rotary fan's 700 air intake 704, and first and second air outputs 706, 708 are substantially in line with the flow of air 306' flowing from the air pre-cleaner 400'.

The cooler assembly 300' operates similarly or substantially similarly to how the cooler assembly 300 operates, except as otherwise indicated below. Specifically, the air 306' enters the rotary fan 700 via the air intake 704. The debris 312' inside air 306' are pushed towards the outer sides of the housing 702 via the rotatable blade 712 as the air 306' travels through a longitudinal length of the housing 702. The debris 312' are expelled outside the header through the second air output 708 while the clean air 310' is directed to the heat exchanger 302' via the first air output 706.

The advantages of a header having a cooler assembly as disclosed above are apparent. For example, it is well known that hydraulic systems utilizing airflow to cool hydraulic fluid to be used by an output shaft, e.g., hydraulic steering, must be kept as clean as possible in order to prevent damage to the system. It is understood that debris entering the hydraulic system can cause extensive and costly damage, which will significantly reduce the efficiency and value of the header. Therefore, it is desired that the air entering the hydraulic system be as clean as possible. Utilizing two separate cleaning systems, in conjunction with, e.g., filters or other filtration systems, greatly minimizes the risk that air having harmful particulates will enter the hydraulic system. Additionally, the two separate cleaning systems may be configured to target cleaning of different types of debris. For example, the air pre-cleaner can be targeted to expel large particulates, such as rocks, while the rotary fan can be targeted to expel soft particulates, such as crop pieces.

While the present disclosure has been described with reference to exemplary embodiments, it will be appreciated by those skilled in the art that various changes may be made and equivalents may be substituted for elements thereof without departing from the scope of the present disclosure. For example, features described in one embodiment may be incorporated into a different embodiment.

In addition, modifications may be made to adapt a particular situation or material to the teachings of the present disclosure without departing from the essential scope thereof. For example, the various ducts may be formed in other ways known in the art rather than what is explicitly disclosed. It is to be understood, therefore, that the present disclosure is not limited to the particular aspects disclosed, but it is intended to cover modifications within the spirit and scope of the present disclosure as defined by the appended claims and as discussed above.

What is claimed is:

1. A header for an agricultural harvester comprising:
   a frame;
   a cooler assembly supported by the frame for cooling a hydraulic system of the header, the cooler assembly including:
      an air pre-cleaner for receiving air and outputting a flow of air,
      a rotary fan downstream the air pre-cleaner, the rotary fan having:
         an air intake in fluid communication with the air pre-cleaner for receiving the flow of air,
         a first air output in fluid communication with the air intake,
         a second air output in fluid communication with the air intake and spaced from the first air output, and
         a baffle between the first air output and the second air output, the baffle movable between a first position and a second position relative to a central rotational axis of the rotary fan and configured to adjust a size of one of the first air output and the second air output, and
      a heat exchanger downstream and in fluid communication with the first air output of the rotary fan; and
   a hydraulic system downstream the heat exchanger for receiving an output flow of air from the cooler assembly.

2. The header of claim 1, wherein the cooler assembly further includes a duct between the air pre-cleaner and the rotary fan.

3. The header of claim 2, wherein the duct is conically shaped.

4. The header of claim 1, wherein the cooler assembly further includes an airflow duct between the rotary fan and the heat exchanger.

5. The header of claim 1, wherein the air pre-cleaner includes:
an air intake;
an angled fin downstream the air intake configured to divert airflow to a lateral side of the air pre-cleaner;
a rotatable blade downstream the angled fin;
an opening downstream the angled fin along a lateral side of the air pre-cleaner; and
an outlet.

6. The header of claim 5, wherein the outlet of the air pre-cleaner faces a direction substantially parallel a longitudinal length of the header.

7. The header of claim 1, wherein the second air output of the rotatory fan is radially spaced further than the first air output from a central rotational axis of the rotary fan.

8. The header of claim 1, wherein the first air output of the rotatory fan directs an output flow of air in a direction substantially transverse to a direction of the flow of air from the air pre-cleaner.

9. The header of claim 1, further comprising a fan adjacent the heat exchanger.

10. An agricultural harvester comprising:
a cab; and
a header including:
a frame;
a cooler assembly supported by the frame for cooling a hydraulic system of the header, the cooler assembly including:
an air pre-cleaner for receiving air and outputting a flow of air,
a rotary fan downstream the air pre-cleaner, the rotary fan having:
an air intake in fluid communication with the air pre-cleaner for receiving the flow of air,
a first air output in fluid communication with the air intake, and
a second air output in fluid communication with the air intake and spaced from the first air output,
a heat exchanger downstream and in fluid communication with the first air output of the rotary fan, and
a baffle between the first air output and the second air output, the baffle movable between a first position and a second position relative to the central rotational axis of the rotary fan and configured to adjust a size of one of the first air output and the second air output; and
a hydraulic system downstream the heat exchanger for receiving an output flow of air from the cooler assembly.

11. The agricultural harvester of claim 10, wherein the second air output of the rotary fan is radially spaced further than the first air output from a central rotational axis of the rotary fan.

12. The agricultural harvester of claim 10, wherein the first air output of the rotary fan directs an output flow of air in a direction substantially transverse to a direction of the flow of air from the air pre-cleaner.

* * * * *